United States Patent
Sun

(10) Patent No.: US 9,358,649 B2
(45) Date of Patent: Jun. 7, 2016

(54) SILENT APPARATUS FOR GRABBING A KNIFE FROM A TURRET

(71) Applicant: CHEN SOUND INDUSTRIAL CO., LTD., Taichung (TW)

(72) Inventor: Ying Sun, Taichung (TW)

(73) Assignee: CHEN SOUND INDUSTRIAL CO., LTD., Taichung (TW)

( * ) Notice: Subject to any disclaimer, the term of this patent is extended or adjusted under 35 U.S.C. 154(b) by 247 days.

(21) Appl. No.: 14/084,556

(22) Filed: Nov. 19, 2013

(65) Prior Publication Data

US 2015/0141226 A1    May 21, 2015

(51) Int. Cl.
*B23Q 3/155* (2006.01)
*B23Q 3/157* (2006.01)

(52) U.S. Cl.
CPC .......... *B23Q 3/1554* (2013.01); *B23Q 3/15713* (2013.01); *B23Q 3/15773* (2013.01); *B23Q 2003/15586* (2013.01); *Y10S 483/902* (2013.01); *Y10T 483/1755* (2015.01); *Y10T 483/1767* (2015.01); *Y10T 483/18* (2015.01)

(58) Field of Classification Search
CPC ............. B23Q 3/1554; B23Q 3/15713; B23Q 3/15773; Y10T 483/1748; Y10T 483/1752; Y10T 483/1755; Y10T 483/176; Y10T 483/1762; Y10T 483/1767; Y10T 483/1771
USPC ............... 483/36, 38, 39, 41, 42, 44, 46, 902; 294/103.1
See application file for complete search history.

(56) References Cited

U.S. PATENT DOCUMENTS 6,007,464 A * 12/1999 Hashimoto ........ B23Q 3/15746
294/103.1

FOREIGN PATENT DOCUMENTS

| JP | 63102850 A | * | 5/1988 |
| JP | 01051247 A | * | 2/1989 |
| JP | 03213239 A | * | 9/1991 |
| TW | 200936305 A | * | 9/2009 |
| TW | 201125679 A | * | 8/2011 |
| TW | 201244871 A | * | 11/2012 |

* cited by examiner

*Primary Examiner* — Erica E Cadugan
*Assistant Examiner* — Michael Vitale

(57) ABSTRACT

A silent knife-grabbing apparatus includes a stationary disc, a rotary bar, and two locking units each including a latch, a lever unit, and two pushers. The latch is movable between a releasing position to place a first end thereof substantially out of a space of a clasp of the rotary bar and a locking position to place the first end in the space. The lever unit is movable between a folded position to place the latch in the releasing position and an extended position to place the latch in the locking position. A first end of the first pusher normally contacts the stationary disc so that a second end of the first pusher places the lever unit in the folded position. An end of the second pusher places the lever unit in the extended position when the upper end of the first pusher enters a recess of the stationary disc.

17 Claims, 4 Drawing Sheets

SILENT APPARATUS FOR GRABBING A KNIFE FROM A TURRET

BACKGROUND OF INVENTION

1. Field of Invention

The present invention relates to a machine tool and, more particularly, to a silent apparatus for grabbing a knife from a turret of a machine tool.

2. Related Prior Art

As disclosed in Taiwanese Patent I319343, FIGS. 3 to 10, a silent apparatus for grabbing a knife from a turret includes a power unit 30, a stationary disc 31, a shaft 32 and a rotary bar 33. The stationary disc 31 includes two recesses 39 and is placed beneath the power unit 30. The shaft 32 is operatively connected to the power unit 30 and the rotary bar 33 is attached to the shaft 32 so that the power unit 30 rotates the rotary bar 33 via the shaft 32. The rotary bar 33 includes two clasps 34 each formed at an end. This conventional apparatus further includes two locking units 40each including a latch 45, a rod 46, a first spring 41, a pusher 43and a second spring (not numbered). The latch 45 is horizontally movable on the rotary bar 33. The rod 46 includes an end connected to the latch 45 and another end for contact with the pusher 43. The first spring 41 is compressed between a portion 38 of the rotary bar 33 and a nut 48 mounted on the rod 46 so that the first spring 41 biases the latch 45 from the corresponding clasp 34 via the rod 46. The pusher 43 is vertically movable on the rotary bar. The second spring is compressed between a portion of the rotary bar 33 and the pusher 43 so that the second spring biases the pusher 43 to push the rod 46 to move the latch 45toward the corresponding clasp 34. The stationary disc 31normally pushes down the pusher 43 of each locking unit 40 by an upper end and therefore keeps a wedge of the pusher 43 from the rod 46 to allow the first spring 41 to move the latch 45 from the corresponding clasp 34. Then, the power unit 30 rotates the rotary bar 33 via the shaft 32 to bring each clasp 34 into engagement with a knife. Then, the power unit 30 rotates the rotary bar 33 into a position to admit the upper end of the pusher 43 of each locking unit 40 into a corresponding recess 39. Thus, the second spring is allowed to lift the pusher 43 to bring the wedge of the pusher 43 into contact with the rod 46. The rod 46 in turn moves the latch 45toward the corresponding clasp 34. Thus, the latch 45 and the corresponding clasp 34 firmly hold a knife.

As disclosed in Taiwanese Patent I386277, FIGS. 3 to 8, another silent apparatus for grabbing a knife from a turret includes a power unit 30, a stationary disc 31, a shaft 32 and a rotary bar 40. The stationary disc 31 includes two recesses 311 and is placed beneath the power unit 30. The shaft 32 is operatively connected to the power unit 30 and the rotary bar 40 is attached to the shaft 32so that the power unit 30 rotates the rotary bar 40 via the shaft 32. The rotary bar 40 includes two clasps 41 each formed at an end. This conventional apparatus further includes two locking units 50each including a latch 61, a length adjuster 62, a shuttle 63, a pusher 72, a connector 80, and two springs 613 and 73. The length adjuster 62 includes an end attached to the latch 61 and an opposite end attached to the shuttle 63. The latch 61, the length adjuster 62 and the shuttle 63 are horizontally movable on the rotary bar 40. The first spring 613 is compressed between a portion of the latch 61 and a screw (not numbered) secured to the rotary bar 40 so that the first spring 613 biases the latch 61 toward the corresponding clasp 41. The pusher 72 is vertically movable on the rotary bar 40. The connector 80 includes an end pivotally connected to the shuttle 63 and an opposite end pivotally connected to the pusher 72. The second spring 73 is compressed between a portion of the rotary bar 40 and the pusher 72 so that the second spring 73 biases the pusher 72 to push the latch 61 toward the corresponding clasp 41 via the connector 80, the shuttle 63 and the length adjuster 62. The stationary disc 31 normally pushes down the pusher 72 of each locking unit 40 by an upper end and therefore keeps the latch 61 from the corresponding clasp 41. Then, the power unit 30 rotates the rotary bar 40 via the shaft 32 to bring each clasp 41 into engagement with a knife. Then, the power unit 30 rotates the rotary bar 40 into a position to admit the upper end of the pusher 72 of each locking unit 40 into a corresponding recess 311 to allow the second spring 73 to lift the pusher 72 to move the latch 61 toward the corresponding clasp 41. The first spring 613 also works to move the latch 61 toward the corresponding clasp 41. Hence, the latch 61 and the corresponding clasp 41 firmly hold a knife.

As disclosed in Taiwanese Patent I397453, another silent apparatus for grabbing a knife from a turret includes a rotating unit 4, a stationary disc 41, a shaft 40 and a rotary bar 1. The stationary disc 41 includes two recesses 410 and is placed beneath the rotating unit 4. The shaft 40 is operatively connected to the rotating unit 4 and the rotary bar 1 is attached to the shaft 40 so that the rotating unit 4 rotates the rotary bar 1 via the shaft 40. The rotary bar 1 includes two clasps 10 each formed at an end. The third conventional apparatus further includes two locking units 3each including a latch 31, a length adjuster 32, a shuttle 30, a pusher 2, and two springs 33 and 21. The length adjuster 32includes an end attached to the latch 31 and an opposite end attached to the shuttle 30. The latch 31, the length adjuster 32and the shuttle 30 are horizontally movable on the rotary bar 1. The first spring 33 is compressed between a portion of the latch 31and a portion of the rotary bar 1 so that the first spring 33 biases the latch 31 toward the corresponding clasp 10. The pusher 2 is vertically movable on the rotary bar 1. The shuttle 30 includes two lugs 302. The pusher 2 includes a fin 22 that includes an inclined slot 23. The fin 22 is placed between the lugs 302. A pin 24 is inserted in the slot 23 through the lugs 302. The second spring 21is compressed between a portion of the rotary bar 1 and the pusher 2 so that the second spring 21 biases the pusher 2 to push the latch 31 toward the corresponding clasp 10 as the pin 24 slides along the slot 23. The stationary disc 41 normally pushes down the pusher 2 of each locking unit 3 by an upper end and therefore keeps the latch 31 from the corresponding clasp 10. Then, the rotating unit 4rotates the rotary bar 1 via the shaft 40 to bring each clasp 10 into engagement with a knife. Then, the rotating unit 4 rotates the rotary bar 1 into a position to admit the upper end of the pusher 2 of each locking unit 3 into a corresponding recess 410 to allow the second spring 21 to lift the pusher 2 to move the latch 31 toward the corresponding clasp 10. The first spring 33 also works to move the latch 31 toward the corresponding clasp 10. Hence, the latch 31 and the corresponding clasp 10 firmly hold a knife.

The present invention is therefore intended to obviate or at least alleviate the problems encountered in the prior art.

SUMMARY OF INVENTION

It is the primary objective of the present invention to provide a silent apparatus for grabbing a knife from a turret of a machine tool.

To achieve the foregoing objective, the apparatus includes a stationary disc, a rotary bar, and two locking units. The stationary disc includes two recesses in a lower face. The rotary bar includes two clasps each including a space. Each locking unit includes a latch, a lever unit, an upper pusher and a lower pusher. The latch includes a first end and a second end and is movable on the rotary bar between a releasing position to place the first end substantially out of the space of a corresponding one of the clasp and a locking position to place the first end in the space of the corresponding clasp. The lever unit is movable between a folded position to place the latch in the releasing position and an extended position to place the latch in the locking position. The upper pusher includes an upper end and a lower end. The upper end of the upper pusher normally contacts the stationary disc so that the lower end of the upper pusher places the lever unit in the folded position. The lower pusher includes an upper end for placing the lever unit in the extended position when the upper end of the upper pusher selectively enters one of the recesses of the stationary disc.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
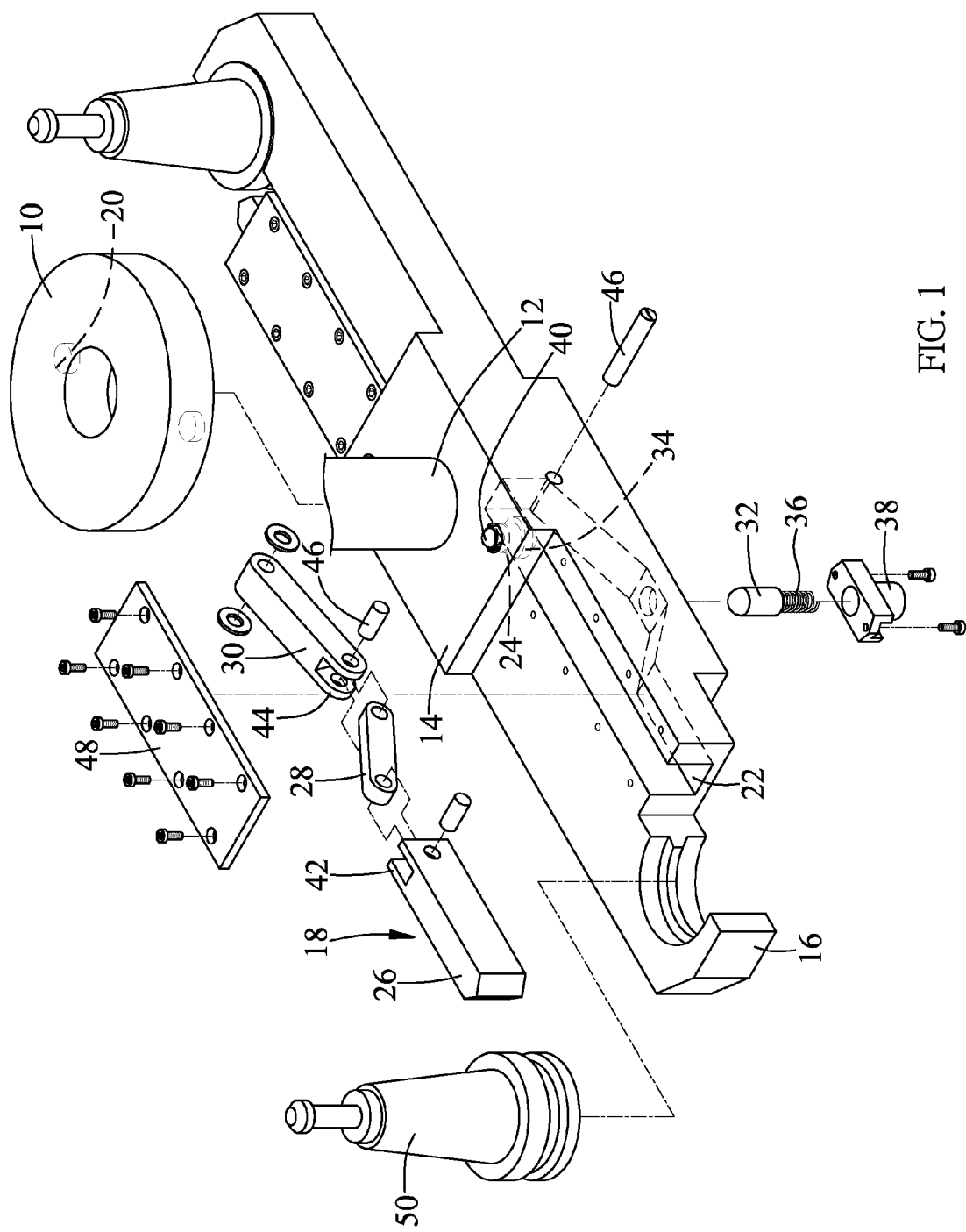
FIG. 1 is an exploded view of a silent apparatus for grabbing a knife from a turret of a machine tool according to the first embodiment of this invention.
Figure 2:
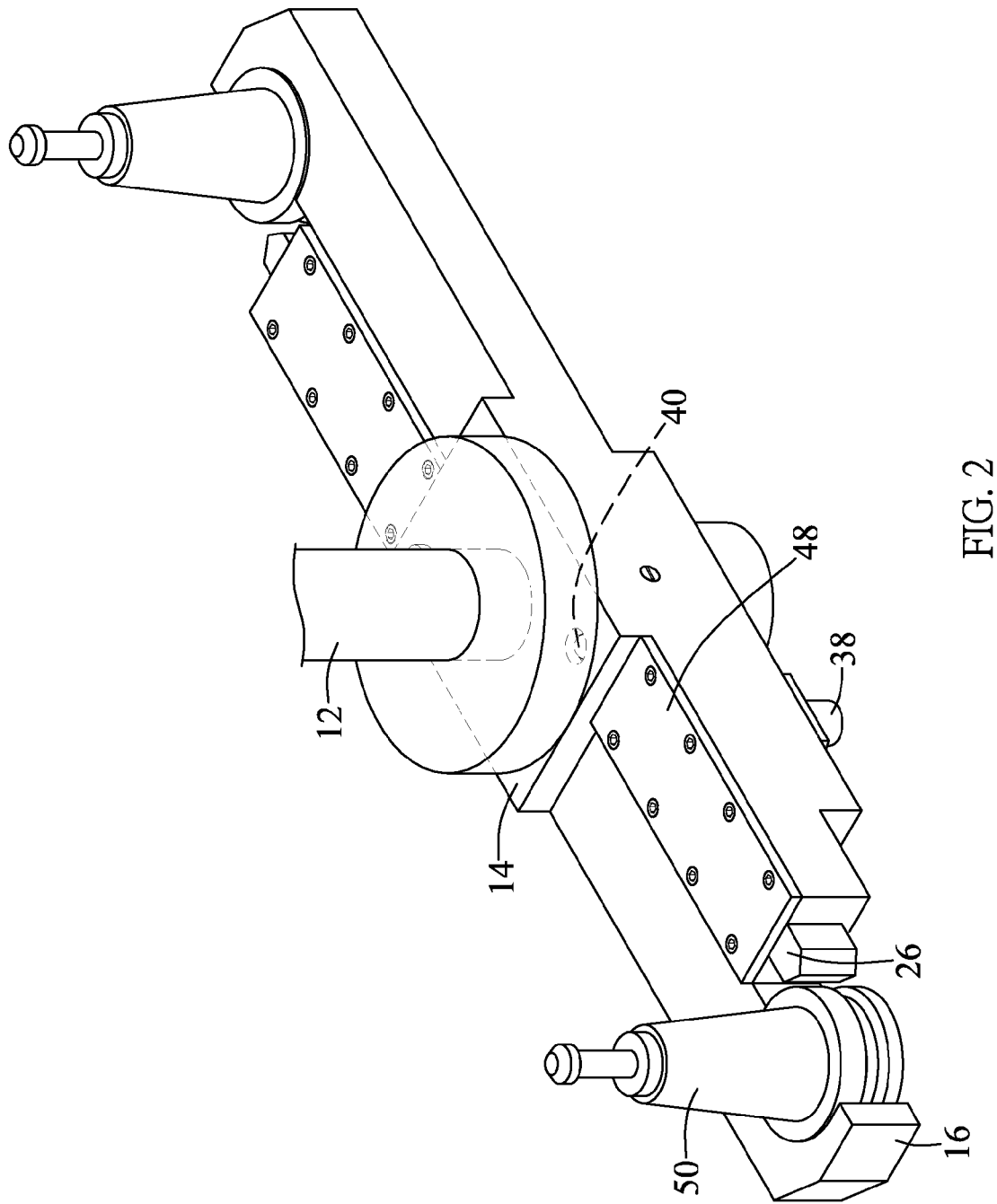
FIG. 2 is a perspective view of the apparatus shown in FIG. 1.

Referring to FIGS. 1 to 4, there is a silent knife-grabbing apparatus according to a first embodiment of the present invention. The silent knife-grabbing apparatus is used to grab a knife 50 from a turret of a machine tool (not shown). The silent knife-grabbing apparatus includes a stationary disc 10, a shaft 12, a rotary bar 14, two clasps 16, and two locking units 18.

The stationary disc 10 includes two recesses 20 made in a lower face. The stationary disc 10 is placed beneath a rotating unit (not shown).

The shaft 12 is inserted through a central aperture made in the stationary disc 10. The shaft 12 is operatively connected to the rotating unit so that the shaft 12 can be rotated by the rotating unit.

The rotary bar 14 is connected to the shaft 12 so that the rotary bar 14 can be rotated by the shaft 12. In detail, a middle portion of the rotary bar 14 is connected to a lower end of the shaft 12.

Each of the clasps 16 is formed at a corresponding end of the rotary bar 14. The clasps 16 extend in opposite directions.

The rotary bar 14 includes two grooves 22, two upper apertures 24 and two lower apertures 25. Each of the grooves 22 is in communication with a corresponding one of the upper apertures 24. Each of the grooves 22 is in communication with a corresponding one of the lower apertures 25.

Each of the locking units 18 includes a latch 26, two levers 28 and 30, an upper pusher 32, a lower pusher 34, a spring 36 and a cup 38. The latch 26 includes a tapered end and two lugs 42 opposite to the tapered end. The lever 28 is formed with two ends. The lever 30 includes two lugs 44 and an end opposite to the lugs 44. The first end of the lever 28 is placed between the lugs 42. Moreover, the first end of the lever 28 is pivotally connected to the lugs 42 by a pin 46. The second end of the lever 28 is placed between the lugs 44. The second end of the lever 28 is pivotally connected to the lugs 44 by another pin 46. The levers 28 and 30 together form a foldable lever unit.

Each of the locking units 18 is retained in a corresponding one of the grooves 22 by a cover 48. Each of the covers 48 is secured to the rotary bar 14 by screws for example.

Figure 3:
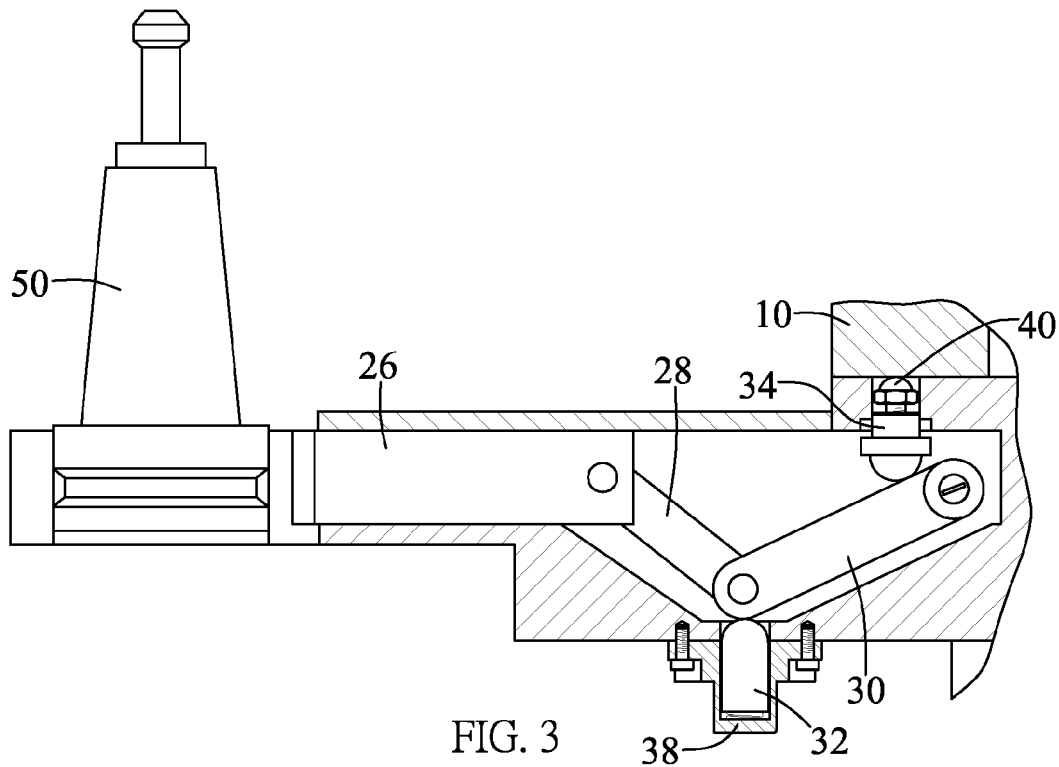
FIG. 3 is a cross-sectional view of the apparatus illustrated in FIG. 2.

Referring to FIG. 3, each of the locking units 18 is placed in a corresponding one of the grooves 22. For briefness, the following description will be based on only one locking unit 18, the corresponding groove 22, the corresponding apertures 24 and 25, and a corresponding one of the clasps 16. The latch 26 and the levers 28 and 30 are placed in the groove 22. However, the tapered end of the latch 26 is placed out of the groove 22. That is, the tapered end of the latch 26 is placed in a space defined by the corresponding clasp 16. The end of the lever 30 is pivotally connected to the rotary bar 14 by another pin 46.

The lower pusher 32 extends through the lower aperture 25. The lower pusher 32 is formed with an upper end in contact with the lever 30 and a lower end biased by the spring 36. The spring 36 is placed in the cup 38, which is attached to the rotary bar 14 by screws for example. Thus, the spring 36 is compressed between the cup 38 and the lower pusher 32. The upper pusher 32 is preferably a hollow element to receive at least a portion of the spring 36.

The upper pusher 34 extends through the upper aperture 24. The upper pusher 34 includes a lower end in contact with the lever 30 and an upper end normally in contact with the disc 10.

An adjuster 40 is connected to the upper end of the upper pusher 32. The adjuster 40 is preferably a screw inserted in a screw hole made in the upper end of the upper pusher 32. The total length of the adjuster 40 plus the upper pusher 32 is adjustable by rotating the adjuster 40 in the upper pusher 32.

In use, the adjuster 40 is normally in contact with the disc 10. The lower end of the upper pusher 34 places the lever 30 in a lower position. The lever 30 places the lever 28 in a lower position. The lever 28 places the latch 26 in a releasing position. Thus, the tapered end of the latch 26 fully opens the space defined by the clasp 16 to receive the knife 50. The lever 30 loads the spring 36.

Figure 4:
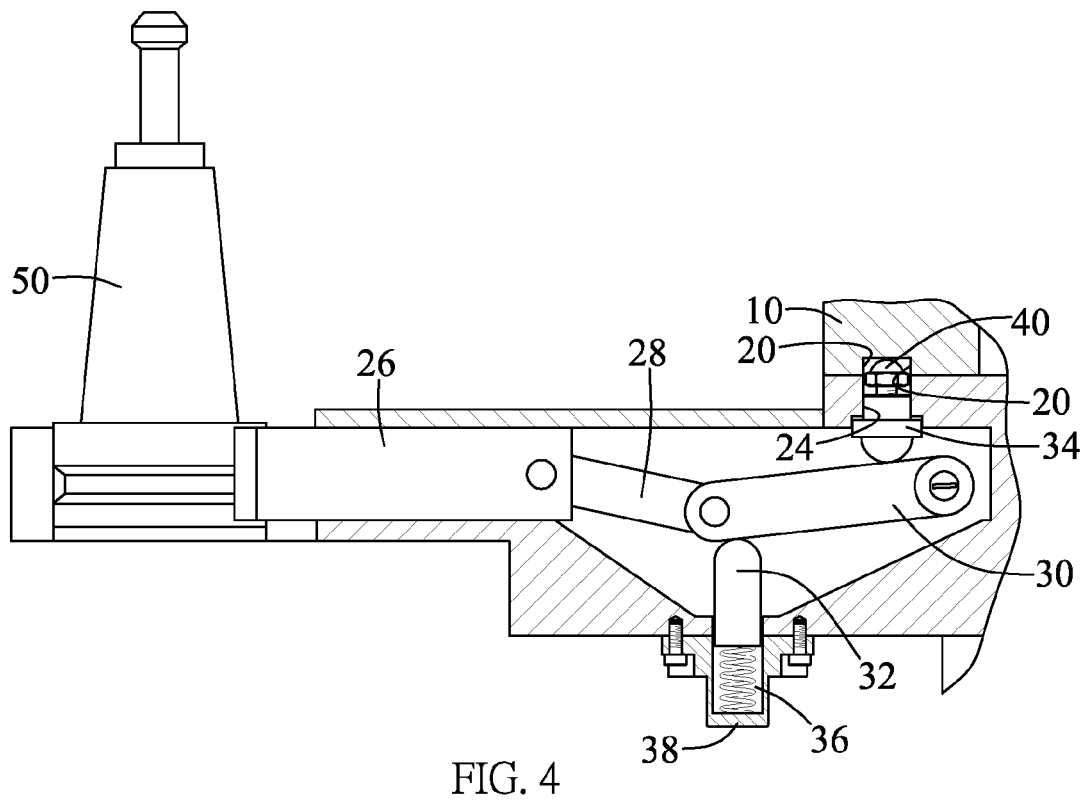
FIG. 4 is a cross-sectional view of the apparatus in another position than shown in FIG. 2.

Referring to FIG. 4, the shaft 12 rotates the rotary arm 14 into a grabbing position where the clasp 16 reaches the knife 50. Now, the aperture 24 is aligned with one of the recesses 20 to allow the adjuster 40 and the upper end of the upper pusher 34 to enter the recess 20, i.e., to allow the adjuster 40 and the upper pusher 34 to reach an upper position. The spring 36 lifts the lower pusher 32 into an upper position. The lower pusher 32 pivots the lever 30 into an upper position. The lever 30 pivots the lever 28 into an upper position. The lever 28 pushes the latch 26 into a locking position. The tapered end of the latch 26 closes the space defined by the clasp 16 a little. Therefore, the latch 26 and the clasp 18 firmly grab the knife 50.

As mentioned above, the total length of the adjuster 40 plus the upper pusher 32 is adjustable by rotating the adjuster 40 in the upper pusher 32. Thus, the lower and upper positions of the levers 28 and 30 are adjustable, and so are the releasing and locking positions of the latch 26. The releasing and locking positions of the latch 26 are adjusted according to the width of the knife 50.

Figure 5:
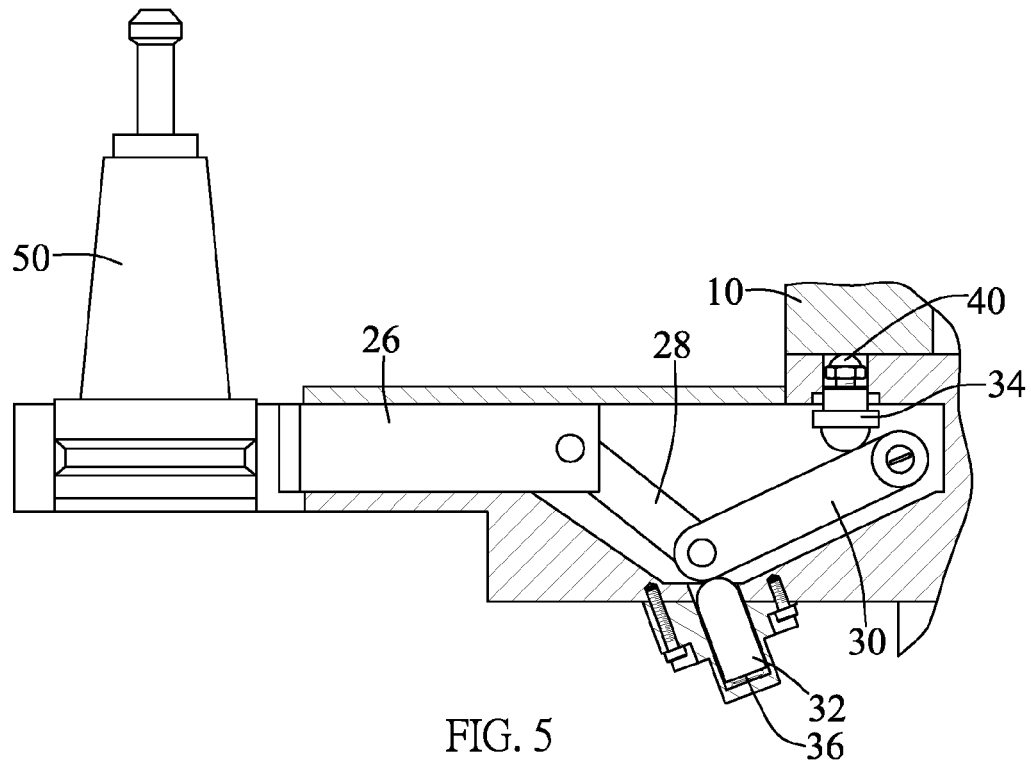
FIG. 5 is a cross-sectional view of a silent apparatus for grabbing a knife from a turret of a machine tool according to the second embodiment of the present invention.
Figure 6:
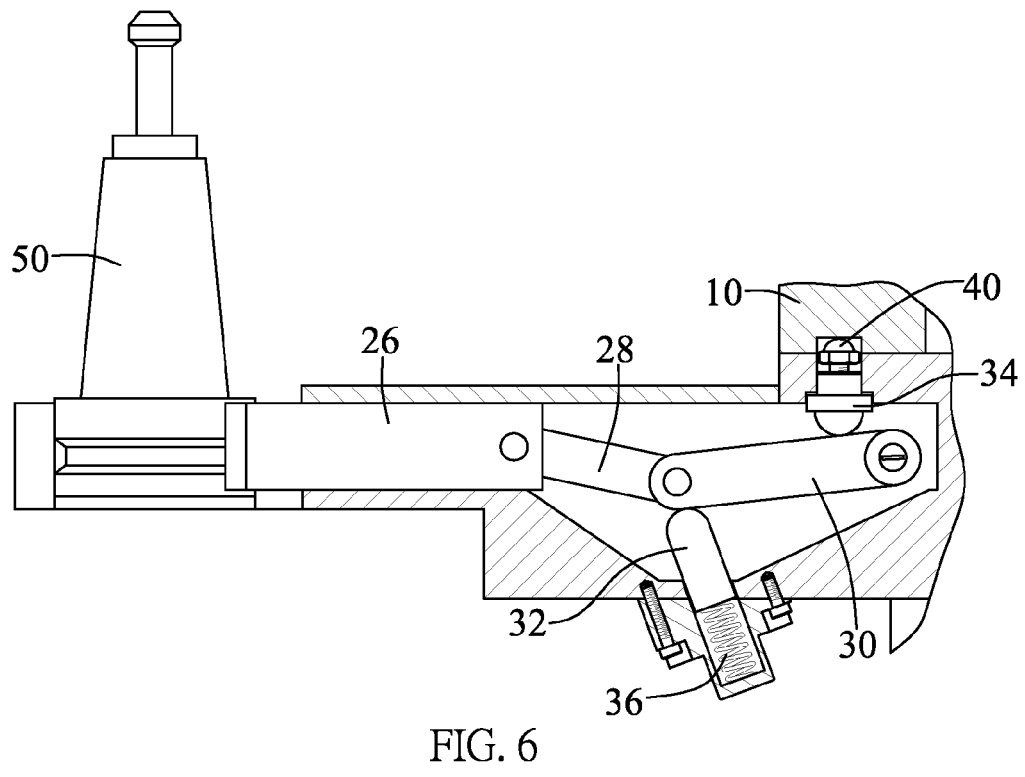
FIG. 6 is a cross-sectional view of the apparatus in another position than shown in FIG. 5.

Referring to FIGS. 5 and 6, there is a silent apparatus for grabbing a knife from a turret of a machine tool according to a second embodiment of the present invention. The second embodiment is identical to the first embodiment except that the lower pusher 32 substantially extends along the arched trace of the pin 46 that interconnects the levers 28 and 30. The spring 36 substantially extends along the arched trace of the pin 46 that interconnects the levers 28 and 30. Thus, the spring 36 expands and shrinks substantially along a rectilinear path, i.e., the spring 36 suffers little undesirable buckling so that the spring 36 continues to work for a long period of time.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A silent knife-grabbing apparatus including:
  a stationary disc including two recesses in a first face;
  a rotary bar including two clasps, each including a space; and
  two locking units, each including:
    a latch including a first end and a second end and movable on the rotary bar between a releasing position to place the first end substantially out of the space of a corresponding one of the clasps and a locking position to place the first end in the space of the corresponding clasp;
    a foldable lever unit for connecting the latch to the rotary bar, wherein the foldable lever unit is movable between a folded position to place the latch in the releasing position and an extended position to place the latch in the locking position;
    a first pusher including a first end and a second end, wherein the first end of the first pusher contacts the disc so that the second end of the first pusher places the foldable lever unit in the folded position;
    a second pusher including a first end for placing the lever unit in the extended position when the first end of the first pusher selectively enters one of the recesses of the disc; and
    an adjuster movably connected to the first end of the first pusher, wherein the adjuster is a screw inserted in a screw hole made in the first end of the first pusher.

2. The silent knife-grabbing apparatus according to claim 1, further including a shaft extending through the stationary disc, wherein the rotary bar is connected to the shaft.

3. A silent knife-grabbing apparatus including:
  a stationary disc including two recesses in a first face;
  a rotary bar including two clasps, each including a space; and
  two locking units, each including:
    a latch including a first end and a second end and movable on the rotary bar between a releasing position to place the first end substantially out of the space of a corresponding one of the clasps and a locking position to place the first end in the space of the corresponding clasp;
    a foldable lever unit for connecting the latch to the rotary bar, wherein the foldable lever unit is movable between a folded position to place the latch in the releasing position and an extended position to place the latch in the locking position;
    a first pusher including a first end and a second end, wherein the first end of the first pusher contacts the disc so that the second end of the first pusher places the foldable lever unit in the folded position; and
    a second pusher including a first end for placing the lever unit in the extended position when the first end of the first pusher selectively enters one of the recesses of the disc;
  wherein the foldable lever unit includes:
    a first lever including a first end and a second end, wherein the first end of the first lever is pivotally connected to the second end of the latch; and
    a second lever including a first end and a second end, wherein the first end of the second lever is pivotally connected to the second end of the first lever, wherein the second end of the second lever is pivotally connected to the rotary bar.

4. The silent knife-grabbing apparatus according to claim 3, further including an adjuster movably connected to the first end of the first pusher.

5. The silent knife-grabbing apparatus according to claim 4, wherein the adjuster is a screw inserted in a screw hole made in the first end of the first pusher.

6. The silent knife-grabbing apparatus according to claim 3, wherein the latch includes two lugs, wherein the first end of the first lever is placed between the lugs of the latch.

7. The silent knife-grabbing apparatus according to claim 3, wherein the second lever includes two lugs, wherein the second end of the first lever is placed between the lugs of the second lever.

8. The silent knife-grabbing apparatus according to claim 7, wherein the rotary bar includes two first apertures, wherein the first pusher of each of the locking units extends through a corresponding one of the first apertures.

9. The silent knife-grabbing apparatus according to claim 7, wherein the rotary bar includes two second apertures, wherein the second pusher of each of the locking units extends through a corresponding one of the second apertures.

10. The silent knife-grabbing apparatus according to claim 9, wherein each of the locking units includes a cup attached to the rotary bar, wherein the cup receives a second end of the second pusher.

11. The silent knife-grabbing apparatus according to claim 10, wherein each of the locking units includes a spring compressed between the cup and the second pusher.

12. The silent knife-grabbing apparatus according to claim 11, wherein the second pusher comprises a hollow element for receiving a portion of the spring.

13. The silent knife-grabbing apparatus according to claim 11, wherein the second pusher and the spring extend substantially perpendicular to a rectilinear trace of the latch.

14. The silent knife-grabbing apparatus according to claim 11, wherein the second pusher and the spring are extendable along a trace swept by the second lever.

15. The silent knife-grabbing apparatus according to claim 3, wherein the rotary bar includes two grooves, each for receiving a corresponding one of the locking units.

16. The silent knife-grabbing apparatus according to claim 15, wherein each of the locking units includes a cover attached to the rotary bar to keep the latch and the first and second levers in the corresponding groove.

17. The silent knife-grabbing apparatus according to claim 3, further including a shaft extending through the stationary disc, wherein the rotary bar is connected to the shaft.

* * * * *